(12) United States Patent
Justen et al.

(10) Patent No.: US 9,003,011 B2
(45) Date of Patent: Apr. 7, 2015

(54) REMOTE MANAGEMENT SYSTEM AND METHOD FOR SERVICE OBJECTS

(75) Inventors: Pascal Justen, Brussels (BE); Christoph Stevens, Stekene (BE); Werner Mario Liekens, Sint Katelijne Waver (BE); Jan Coppens, Ghent (BE); Christele Bouchat, Antwerp (BE); Willem Jozef Amaat Acke, Rijmenam (BE)

(73) Assignee: Alcatel Lucent, Boulogne-Billancourt (FR)

( * ) Notice: Subject to any disclaimer, the term of this patent is extended or adjusted under 35 U.S.C. 154(b) by 1138 days.

(21) Appl. No.: 12/170,837

(22) Filed: Jul. 10, 2008

(65) Prior Publication Data
US 2009/0019104 A1    Jan. 15, 2009

(30) Foreign Application Priority Data
Jul. 13, 2007  (EP) .................................. 07290886

(51) Int. Cl.
G06F 15/173    (2006.01)
H04L 12/24     (2006.01)
G06F 9/54      (2006.01)
H04L 12/28     (2006.01)

(52) U.S. Cl.
CPC ............ *H04L 41/0266* (2013.01); *G06F 9/541* (2013.01); *G06F 9/547* (2013.01); *G06F 9/548* (2013.01); *H04L 12/2809* (2013.01); *H04L 41/0233* (2013.01); *H04L 41/08* (2013.01); *H04L 41/0886* (2013.01)

(58) Field of Classification Search
USPC ......................................... 709/217, 220, 221
See application file for complete search history.

(56) References Cited

U.S. PATENT DOCUMENTS

| | | | | |
|---|---|---|---|---|
| 2003/0018753 A1* | 1/2003 | Seki | .............................. | 709/219 |
| 2003/0182467 A1* | 9/2003 | Jensen et al. | .................. | 709/317 |
| 2005/0114491 A1 | 5/2005 | Bushmitch | | |
| 2005/0154785 A1* | 7/2005 | Reed et al. | ..................... | 709/217 |
| 2006/0282863 A1* | 12/2006 | Bushmitch et al. | ............. | 725/80 |
| 2007/0147396 A1* | 6/2007 | Lee et al. | ....................... | 370/401 |
| 2008/0320114 A1* | 12/2008 | Bodin et al. | .................. | 709/220 |
| 2009/0030979 A1* | 1/2009 | Hayes, Jr. | ..................... | 709/203 |
| 2009/0132698 A1* | 5/2009 | Barnhill, Jr. | .................. | 709/224 |
| 2010/0131643 A1* | 5/2010 | Okayama | ...................... | 709/224 |

FOREIGN PATENT DOCUMENTS

DE    202006006419 U1   10/2006

OTHER PUBLICATIONS

DSLHome-Technical Working Group: "CPE WAN Management Protocol" Internet Citation (Online) May 2004, XP002316355.
Erich Gamma et al, "Design Patterns: elements of reusable object-oriented software passage" Design Patterns. Elements of Reusable Object-Oriented Software, 1995, pp. 1-9, 207, XP002200550.
DSL-Home-Technical Working Group: "DSL Forumm TR-111, Applying TR-069 to remote management of home networking devices", Internet Citation (Online) Dec. 2005, XP002455794.

* cited by examiner

*Primary Examiner* — Backhean Tiv
(74) *Attorney, Agent, or Firm* — Harness, Dickey & Pierce

(57) ABSTRACT

A remote management system is able to remotely manage service objects (311) in a bundle (301). The remote management system thereto contains a management platform (302) in a customer device where the bundle (301) is installed, a remote management server (304) somewhere in the network, and a management agent (303) able to expose the service object representation (312) of the service objects (311) via a remote management protocol (307) to the remote management server (304). The remote management system in addition is foreseen with a proxy bundle (305) with a generic interface to populate and export a generic service object representation (351) of the service objects (311) towards the management agent (303).

8 Claims, 6 Drawing Sheets

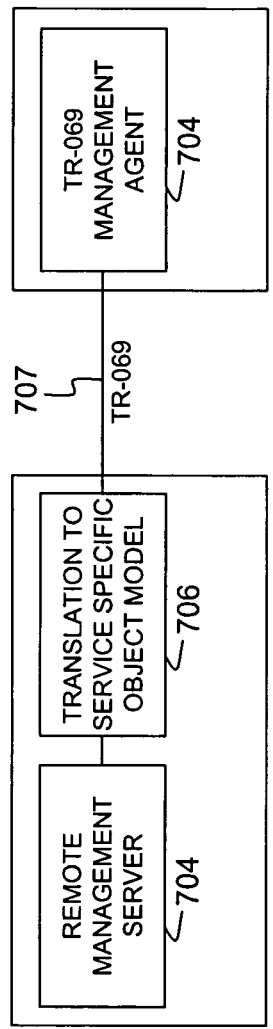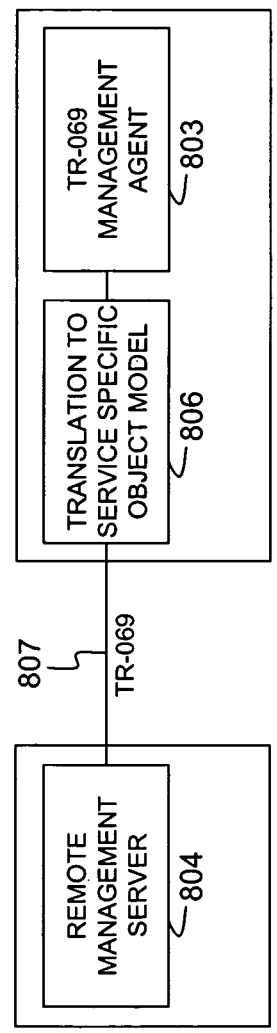

REMOTE MANAGEMENT SYSTEM AND METHOD FOR SERVICE OBJECTS

FIELD OF THE INVENTION

The present invention generally relates to remote management of service software modules—the so called "service objects" according to OSGi terminology—that are shared amongst software applications—the so called "bundles"— installed on customer premises equipment (CPE). A home network typically contains several interconnected CPE devices that offer various applications or user services to the home network user, for instance audio/video/telephony applications, a graphical user interface (GUI), a web browser, etc. At the underlying software level, these applications may share certain services or components, named "service objects" if the CPE devices and the applications are built on a single management platform that supports remote management of the service objects. Examples of such components or service objects are for instance an HyperText Transfer Protocol (HTTP) service, a codec, a Transmission Control Protocol (TCP) service, a driver for audio/video hardware, a GUI toolkit, etc. The remote management involves for instance installation, configuration, invocation, removal, etc. of the service object and/or its parameters and methods by means of a server located somewhere (remotely) in a network with connectivity to the CPE devices. The server is named the auto configuration server (ACS) or remote management server throughout this patent application. Examples of CPE or customer devices are a Digital Subscriber Line (DSL) modem, a Set-Top Box (STB), a personal computer (PC), a digital TV server, a web server, a WiFi point of access, a wireless terminal such as a mobile telephone, a Personal Digital Assistant (PDA), etc. In the context of the current invention, a customer device can also be a device residing in the network whereon remotely manageable services are installed, like for instance a Digital Subscriber Line Access Multiplexer (DSLAM), a remote unit (RU), a service blade, etc. The current invention more particularly relates to the announcement, exposure and manipulation of service objects to or by the remote management server.

BACKGROUND OF THE INVENTION

As is illustrated by FIG. 1, remote management systems consist of a management platform 102 in the customer device, a remote management server 104 in the network, and a remote management protocol 107 for communication between a management client or agent 103 running on the management platform 102 and the remote management server 104.

An example management platform is the OSGi (Open Service Gateway initiative) service platform, which is a Java-based service platform that runs on top of a Java Virtual Machine (JVM) inside the customer device that is remotely managed. Presence of an OSGi service platform in the customer device enables remote installation, update, invocation, removal, etc. of service objects, i.e. software components such as for instance a File Transfer Protocol (FTP) service, from an auto configuration server anywhere in the network without disrupting the operation of the customer device. This way, installation of a service object, upgrading the service object to a new version, re-configuring the service object, adding or activating new features of the service object, and removal of the service object from the customer device, is made possible without dispatching a technician to the customer premises and without requiring an intervention by the customer. Thanks to the management platform, the software services (service objects) and applications (bundles) running on a single customer device or on different customer devices within the same home network can share their capabilities with each other.

The management agent or management client 103 serves as an interface between the service object 111 and the remote management server 104. On the one hand, the management agent 103 enables the management platform 102 in the customer device to expose manageable parameters of the service object 111 to the remote management server 104, on the other hand, the management agent 103 serves as a master coordinating and controlling the lifecycle and the parameter configuration of the bundle(s) installed on a CPE.

One of the roles of the management protocol is to provide a mechanism by which the auto configuration server can securely read or write parameter values to configure the service object software in the customer device and eventually monitor the status and statistics of the customer device. An example management protocol for secure remote management of customer devices is the TR-069 protocol defined by the DSL Forum in its Technical Report TR-069, entitled "CPE WAN Management Protocol" that can for instance be retrieved from the Internet via the following URL:

http://dslforum.org/aboutdsl/tr_table.html

The TR-069 protocol is Remote Procedure Call (RPC) based, i.e. a generic message based mechanism by which the auto configuration server is able to read/write/configure parameters and parameter attributes of a software component running on a CPE device. Each parameter consists of a name-value pair. The name identifies the particular parameter and has a hierarchical structure similar to files in a directory, the different levels being separated by a "." (dot). The value of a parameter may be one of several defined data types. Each parameter further may be defined as a read-only or read-write parameter depending on whether the auto configuration server is allowed to only read the parameter or also to change the value of the parameter. In order to expose a service object to the auto configuration server, the names and values of the remotely manageable parameters of that service object are first communicated to the auto configuration server in response to for instance the TR-069 GetParameterValues instruction. Thereafter, the attributes of the parameters may be communicated in response to for instance the TR-069 GetParameterAttributes instruction.

Alternative remote management protocols are for instance the Open Mobile Alliance-Device Management (OMA-DM) protocol and the Simple Network Management Protocol (SNMP).

A particular example could be an HyperText Transfer Protocol (HTTP) service object that is installed on an ADSL or VDSL modem for client-server communications. All parameters of the HTTP service object constitute the service object representation of the HTTP service object, for instance represented by 112 in FIG. 1 if 111 is assumed to represent the HTTP service object. An example parameter is the number or identification of the port where the HTTP service listens to. The ADSL or VDSL modem is supposed to have an OSGi platform running on top of a Java Virtual Machine. The OSGi platform 102 enables to share the capabilities of the HTTP service object 111 with other applications, e.g. a web browser or a local web server. Via a TR-069 management agent 103 installed on top of the OSGi platform 102, the parameters of the HTTP service object 111 can be made visible and accessible to an auto configuration server (ACS) 104 in the DSL network or indirectly to any other TR-069 aware bundle. However, the bundle 101 where the HTTP service 111 forms part of thereto must explicitly announce the HTTP service object 111 to the local management agent 103, e.g. a TR-069 management agent, via a protocol specific interface or external service object representation 113, e.g. a TR-069/OSGi interface. Although drawn differently in FIG. 1, it is noticed that the external service object representation 113 can directly couple with the service object.

There are several drawbacks resulting from the known way to expose service objects and their parameters to a remote manager. Firstly, every bundle must implement the same but remote protocol specific interface and must consequently conform to the behaviour, object and data model structure imposed by the remote management protocol. This is illustrated by FIG. 2 which shows a first bundle 201 with two service objects 211a and 211b whose service object representations 212a and 212b are exported to the TR-069 management agent 203 via respective TR-069/OSGi interfaces 208a and 208b. Another bundle, Bundle x or 201x in FIG. 2, must implement the same TR-069/OSGi interface 208n to export the service object representation 212n of another service object 211n to the TR-069 management agent 203 in order to enable the latter to further expose the manageable parameters and methods of that service object 211n via the TR-069 protocol 207 to the TR-069 auto configuration server 204. The TR-069 interface for instance serves as an instrument to perform the TR-069 remote procedure calls such as GetParameterNames, GetParameterValues and SetParameterValues. The remote protocol specific interface maps the TR-069 parameters and procedures onto the internal parameters and methods of the bundle, 212a, 212b . . . 212n. In case of an audio bundle for instance, the TR-069 parameter "devices.services.OSGI.audio.volume" is mapped onto the Java parameter "Volume" in the audio bundle, and the TR-069 procedure call GetParameterValues for that parameter is mapped onto the Java method "GetVolume" available in the bundle. The implementation of such remote protocol specific interfaces is a repetitive task that must be executed for every bundle that desires to export a service object for remote management. Every bundle that implements one or more protocol specific interfaces, e.g. TR-069 interfaces, must provide functionality to query and map the TR-069 parameters or external service object representation to the internal representation of the service object, e.g. 112 in FIG. 1 or 212a, 212b and 212n in FIG. 2.

Another drawback of the prior art way of announcing and exposing service objects to a remote management server is that it ties each bundle to a specific remote management protocol. For each type of remote management protocol, e.g. TR-069, OMA-DM, SNMP, etc. a different bundle must be developed which implements the remote protocol specific interface for exposing the service object representation to the corresponding management agent. A TR-069 aware bundle cannot be used on an OMA-DM or SNMP based service platform.

The known mechanism for exposing service objects based on protocol specific interfaces is further limited in that it only provides remote access to the functionality that is exposed by the bundle and in its flexibility in case the underlying service object changes.

It is an objective of the present invention to provide a system and method for remote management of service objects in bundles that does not require implementation of protocol specific interfaces resulting in protocol specific bundles. It is a further objective of the present invention to provide a system and method for remote management of service objects which is more flexible in case of modification of the service object(s), and which does not restrict remote access to the functionality exposed by the bundle.

SUMMARY OF THE INVENTION

According to the present invention, the above defined objectives are realized and the shortcomings of the prior art are overcome by a remote management system for remote management of a bundle having at least one service object with corresponding service object representation, the remote management system comprising a management platform in a customer device where the bundle is installed, a management agent and a remote management server, the management agent being able to expose the service object representation via a remote management protocol to the remote management server, wherein the remote management system further comprises a proxy bundle with a generic service object representation interface adapted to populate and export a generic service object representation of the at least one service object towards the management agent.

Thus, the basic idea of the present invention is the introduction of a new bundle, the proxy bundle, whose task is to offload the implementation of remote management specific interfaces from existing bundles or newly installed bundles. Thanks to the generic service object representation populated and exported by the proxy bundle, the bundles no longer have to map their internal service object representation to the model imposed by the remote management protocol. These bundles consequently can be made protocol independent. In addition, it is noted that the introduction of the proxy bundle, e.g. an OSGi proxy bundle, all service objects running on the OSGi management platform become visible to the remote management server, thus increasing the accessibility and flexibility for remote management of functionality in the bundles.

A further characteristic feature of the management system according to the present invention, concerns the presence of a Java Application Programming Interface adapted to populate the generic service object representation from the service object representation.

Thus, one way to populate the generic object model or generic service object representation in the proxy bundle introduced by the current invention, is through a Java Reflection API. Such Java Reflection API is able to inspect and request all parameters, methods, arguments, types, etc. of all service objects running on the management platform. The generic object model thereafter is transmitted over the remote management protocol towards the remote management server. An alternative solution could for instance use a similar API in another actual or future language or environment, e.g. the .NET environment from Microsoft.

Further optionally, the generic service object representation interface that forms part of the proxy bundle introduced by the current invention may be adapted to map on a remote management protocol interface.

Indeed, the generic interface that populates and exposes the generic service object model may map on e.g. the TR-069 interface or any other remote management protocol interface.

Also optionally, the generic service object representation interface that forms part of the proxy bundle introduced by the current invention may be incorporated in the management agent.

Thus, the management agent which is typically implemented as a bundle installed on the management platform, and the new proxy bundle that forms the basis of the present invention, may be integrated into a single bundle.

The management system according to the present invention may further comprise translation means for translating the generic service object representation to a representation that is understandable by the remote management server (e.g.

the original representation), the translation means residing in between said proxy bundle (305) and said remote management server (304), i.e. including even in the proxy bundle.

This way, the generic object model can further be translated to a proper service representation, such that existing server-side management is not impacted by the changes introduced by the current invention. The optional object model translation step can be performed either on remote server side or on service platform side, i.e. at or near the management agent, or in or near the proxy bundle.

Possibly, the translation means may comprise an eXtensible Markup Language or XML scheme based on eXtensible Stylesheet Language Transformations or XSLT syntax and semantics or a dedicated application.

Indeed, the translation of the generic model can be achieved by an XML scheme using XSLT as underlying technology, or alternatively by a dedicated application.

The proxy bundle in the management system according to the present invention may further comprise means adapted to monitor and notify parameter value changes to the management agent.

Yet another optional aspect of the management system according to the present invention is that the proxy bundle may comprise means adapted to implement a service object interface not present on the management platform.

Thus, the proxy bundle introduced according to the present invention may provide extra functionality such as the creation of service object placeholders or so called "stubs" that implement a known service object interface that is not present on the management platform.

A last optional aspect of the management system according to the invention is that the proxy bundle further may comprises means adapted to troubleshoot running service objects on the management platform.

The proxy bundle lying at the basis of the present invention thus introduces the opportunity of universal service-level troubleshooting on the management platform. The troubleshooting may comprise tracing of service object method calls (e.g. which bundle uses what service objects), monitoring and measurements (e.g. in case of resource allocation problems and conflicts relating to memory, network traffic, or CPU usage), invoking methods of service objects via remote management and performing measurements, or changing parameters in a dynamic and adaptive way, etc.

BRIEF DESCRIPTION OF THE DRAWINGS

FIG. 7 represents a block scheme of a fifth embodiment of the remote management system according to the present invention with translation function at the server side; and FIG. 8 represents a block scheme of a fifth embodiment of the remote management system according to the present invention with translation function at the management platform side.

DETAILED DESCRIPTION OF EMBODIMENT(S)

Figure 1:
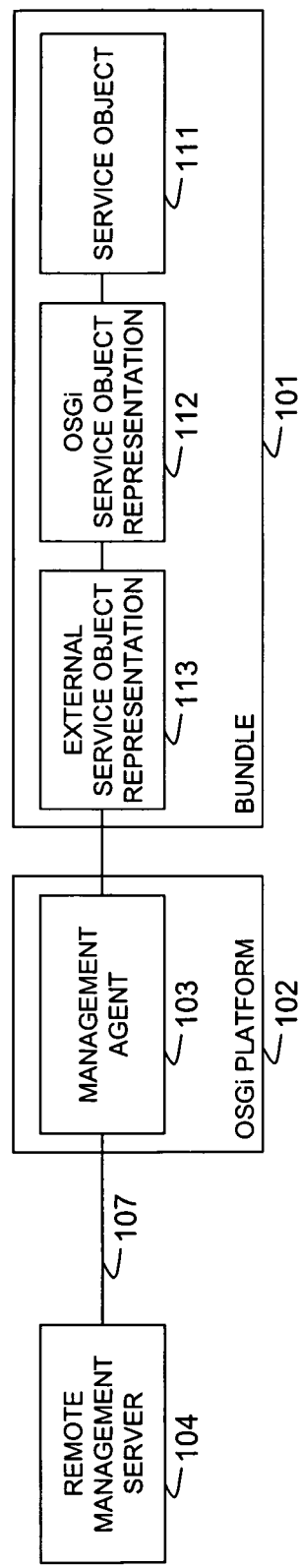
FIG. 1 represents a first block scheme of a prior art remote management system.
Figure 2:
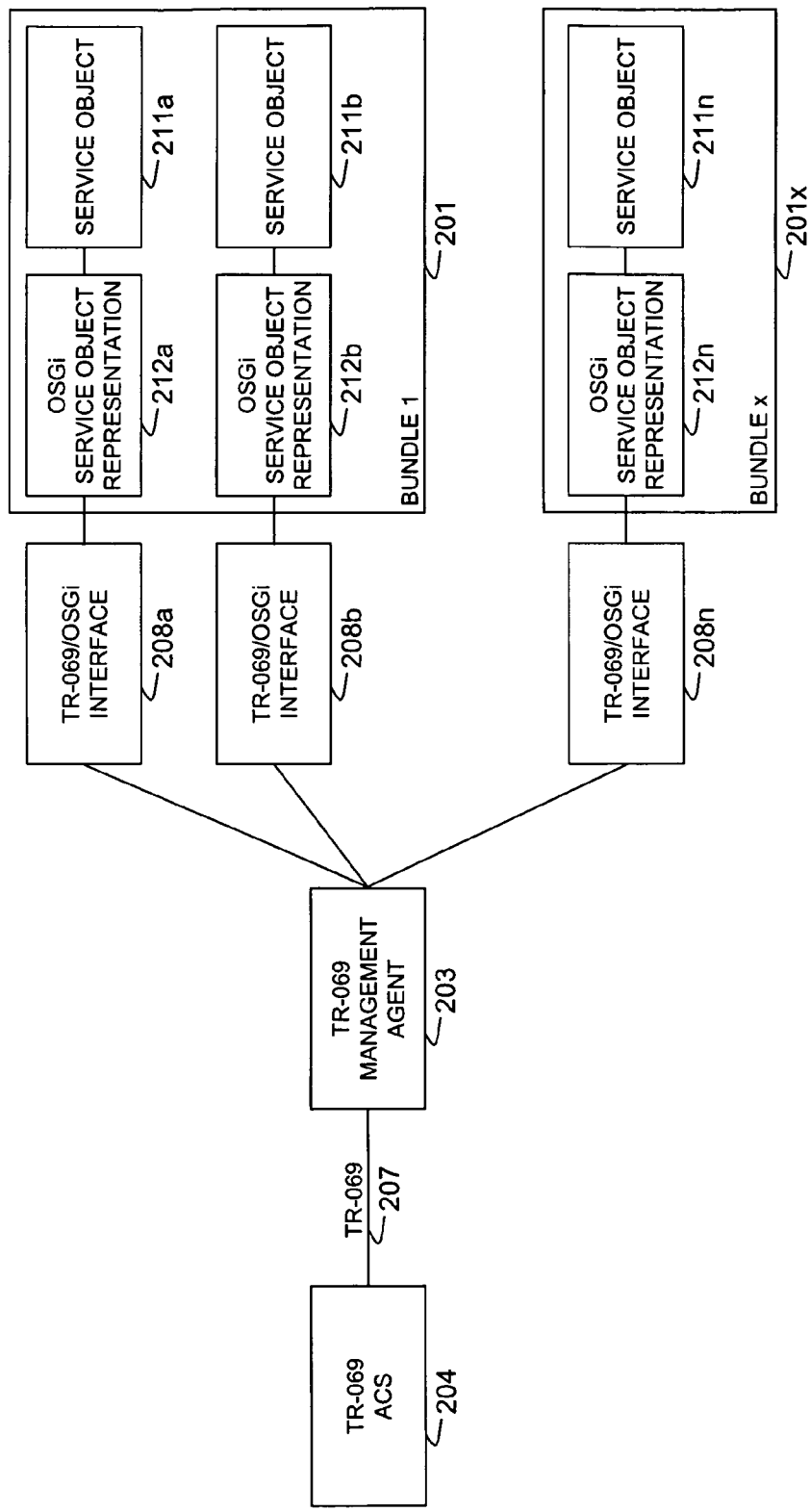
FIG. 2 represents a second block scheme of a prior art remote management system, illustrating the drawbacks thereof.

FIG. 1 and FIG. 2 have been described in detail in relation to the prior art and its shortcomings here above.

Figure 3:
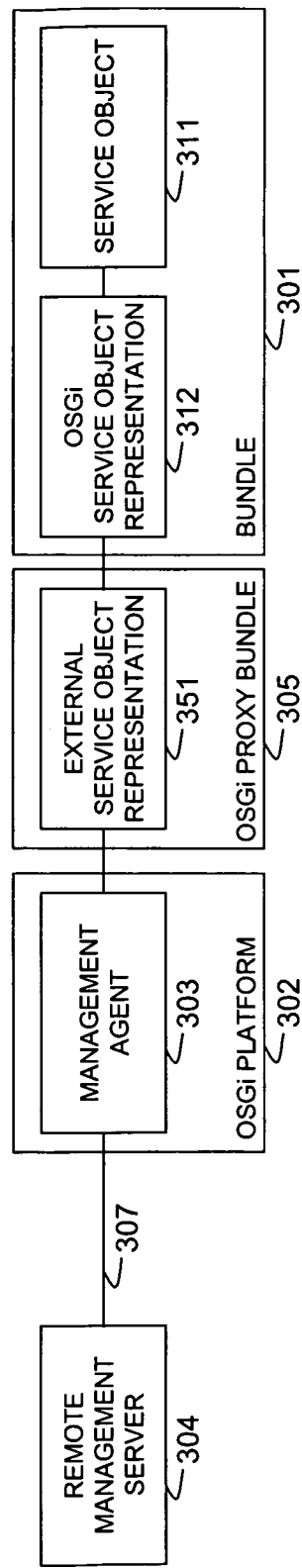
FIG. 3 represents a block scheme of a first embodiment of the remote management system according to the present invention.

FIG. 3 shows an remote management system wherein a bundle 301 is installed on a CPE device with OSGi management platform 302. The bundle has a single service object 311 whose parameters, methods and attributes are described in the OSGi service object representation 312. An additional bundle, the OSGi proxy bundle 305 implements a generic object and data model representation interface towards the management agent 303 installed on the OSGi platform 302. The OSGi proxy bundle 305 uses a Java Reflection API in order to populate the generic service object model 351 from the OSGi service object representation 312 available in the bundle 301. The generic service object model is exposed to the management agent 303 which further transmits this generic object model over a remote management protocol 307 towards the remote management server 304. The parameters, methods and attributes of the service object 311 are made remotely manageable by the remote management server 304 within a need to modify the bundle 301 where it belongs to implement a remote protocol specific interface.

Figure 4:
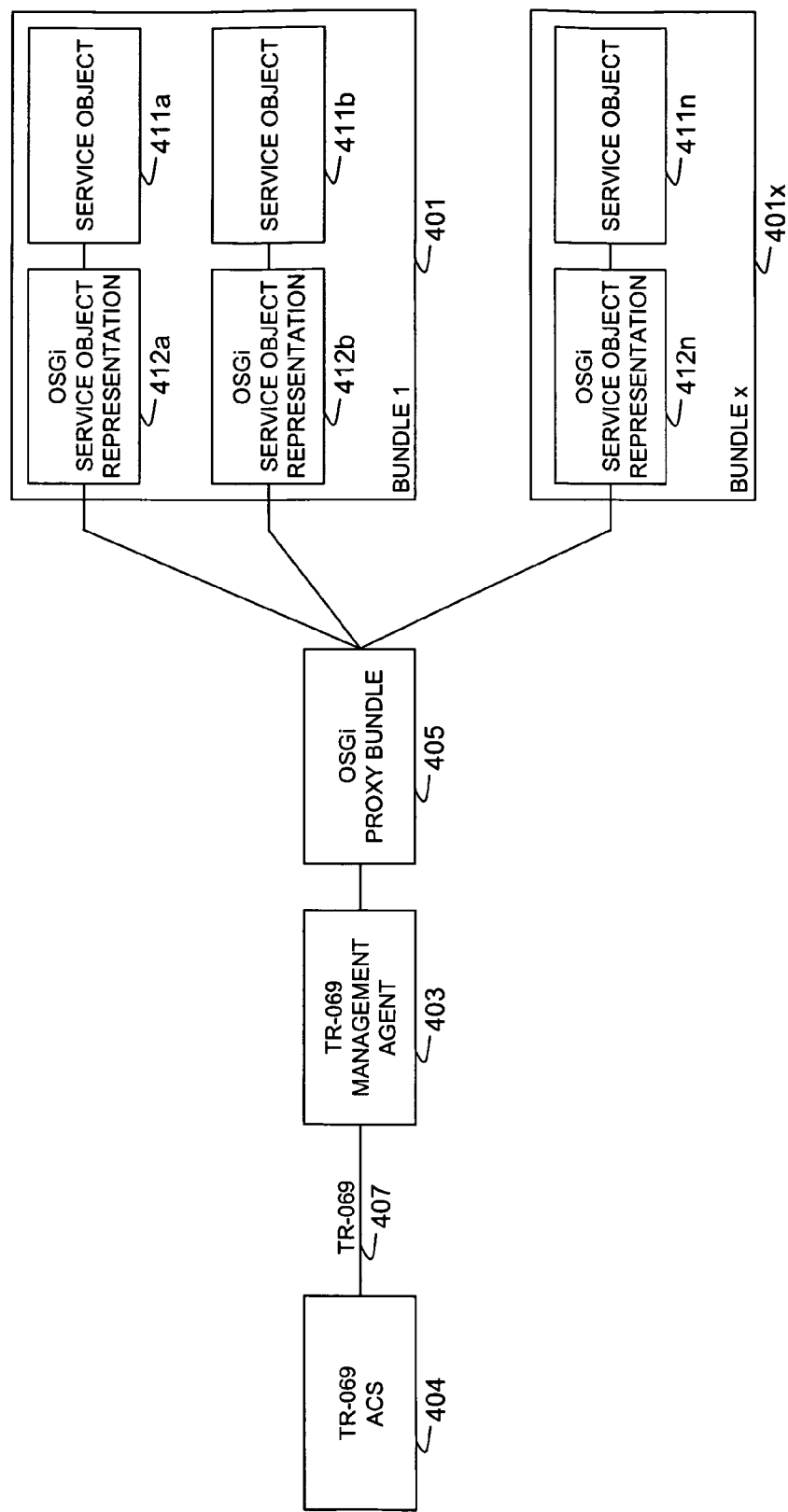
FIG. 4 represents a block scheme of a second, TR-069 based embodiment of the remote management system according to the present invention.

FIG. 4 shows a more specific implementation of the invention where the TR-069 remote management protocol is used to transmit the generic service object model to the remote management server, which is a TR-069 auto configuration server (ACS) in this particular case. In FIG. 4, several bundles are assumed to be installed on one or more CPE devices in a home network. Two of these bundles are drawn: BUNDLE 1 or bundle 401, having two service objects 411a and 411b with respective internal OSGi service object representations 412a and 412b, and BUNDLE x or bundle 401x having a single service object 411n with internal OSGI service object representation 412n. An OSGi proxy bundle 405 again uses a Java Representation API to populate and map the generic service object model that is transmitted to the TR-069 management agent 403. The latter TR-069 management agent 403 further transmits the generic model over the TR-069 protocol 407 to the TR-069 ACS 404. Using this approach, all OSGi service objects running on the OSGi management platform can be made visible to the remote manager 404. At the bundles 401 . . . 401x no extra coding effort is required to implement remote management interfaces that are protocol specific. At the OSGi proxy bundle, a generic interface per service object or a single generic interface for all service objects may be implemented. This generic interface advantageously becomes standardized and may offer a broad set of functionality for remote management. New extra functionalities may comprise the creation of service object placeholders or so called "stubs" that implement a known service object interface which is not present on the OSGi management platform in order to enable extra functions. Another new function would be a generic way to troubleshoot running OSGi service objects on the OSGi management platform. This way, universal service-level troubleshooting would be introduced on the management platform. Such service level troubleshooting could comprise tracing of service object method calls (e.g.

which bundle uses what service objects, when do calls occur, etc.), monitoring and measurements whose results are useful in case of resource allocation problems and conflicts (e.g. memory contention, network traffic, CPU usage), invoking methods of OSGi service objects via remote management and performing measurements, or changing parameters in a dynamic and adaptive way, etc.

The Java Reflection API will use a jar file or compressed Java archive installed on the CPE. When active, it will inspect all service objects and manage a database of all objects and their parameters, methods, attributes, etc. The OSGi proxy then can create and populate the generic object model, as a result of which the management agent can request all parameters, methods, attributes, etc. of all service objects. Whereas the prior art required each service object to implement a protocol specific interface, e.g. a TR-069 interface with predefined parameters, the current invention no longer is restricted by the parameter or procedure call convention of the remote management protocol. Java parameter and method naming can be used for the generic object model.

Figure 5:
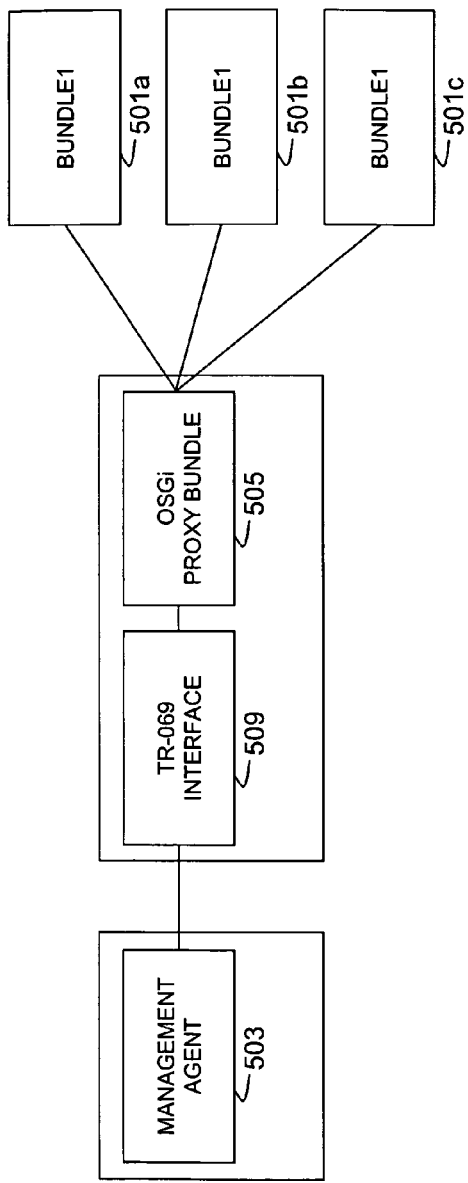
FIG. 5 represents a block scheme of a third embodiment of the remote management system according to the present invention with TR-069 interface in or near the proxy bundle.

As is illustrated by FIG. 5, the generic interface that lies at the basis of the present invention may map onto the TR-069 interface (or any alternative existing remote management protocol interface) in order to avoid any impact on current, existing implementations. As is shown by FIG. 5, bundles 501*a*, 501*b* and 501*c* may expose their service object parameters, methods and attributes via the OSGi proxy bundle 505 which, according to the principles of the current invention, implements a generic service object interface that maps onto TR-069 interface 509. The latter TR-069 interface 509 further transmits the service object model to the management agent 503. No changes are required to current installations of the management agent and/or management servers.

Figure 6:
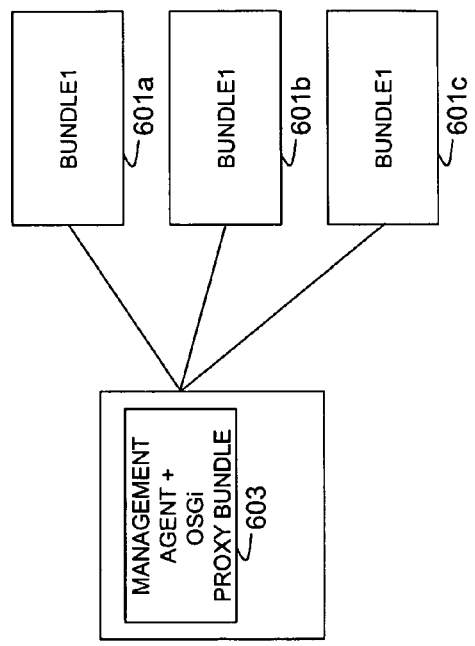
FIG. 6 represents a block scheme of a fourth embodiment of the remote management system according to the present invention with proxy bundle integrated in the remote management agent.

Alternatively, as is shown in FIG. 6, the OSGi proxy bundle and the generic interface implemented thereby may be incorporated in the management agent 603. In such case, the bundles 601*a*, 601*b* and 601*c* shall export their service object representation directly with the newly developed management agent 603.

FIG. 7 and FIG. 8 at last show that the generic object model can further be translated to an appropriate service specific representation, such that the server-side management is not impacted by the changes implied by the current invention. Such translation can be implemented by an XML scheme using XSLT mechanisms. As is illustrated by FIG. 7, the XSLT based translation function 706 can be executed at the server side, i.e. in or near the remote management server 704. In this case, the generic object model is transferred from the TR-069 management agent 704 over the remote management protocol 707 to the translation function 706 residing at server-side. Alternatively, as is depicted in FIG. 8, the XSLT based translation function 806 may be implemented at the service platform side, i.e. in or near the TR-069 management agent 803. Thereafter, the service specific object model is transferred over the TR-069 protocol 807 towards the remote management server 804.

Although the present invention has been illustrated by reference to specific embodiments, it will be apparent to those skilled in the art that the invention is not limited to the details of the foregoing illustrative embodiments, and that the present invention may be embodied with various changes and modifications without departing from the spirit and scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the spirit and scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfill the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order.

The invention claimed is:

1. A remote management system for remote management of a bundle having at least one service object with corresponding service object representation, said remote management system comprising:
a management platform in a customer device where said bundle is installed;
a management agent on the management platform in the customer device; and
a remote management server, said management agent being able to expose said service object representation via a remote management protocol to said remote management server, and wherein
said remote management system further comprises a proxy bundle with a generic service object representation interface configured to populate and export a generic service object representation of said at least one service object towards said management agent on the management platform in the customer device, said generic service object representation being a software service module that is independent of the remote management protocol, wherein said proxy bundle is configured to monitor and notify parameter value changes of the at least one service object to said management agent via the generic service object representation interface.

2. A management system according to claim 1, wherein said proxy bundle comprises a Java Application Programming Interface configured to populate said generic service object representation (351) from said service object representation.

3. A management system according to claim 1, wherein said generic service object representation interface is configured to map on a remote management protocol interface.

4. A management system according to claim 1, wherein said generic service object representation interface is incorporated in said management agent.

5. A management system according to claim 1, wherein said management system further comprises translation means for translating said generic service object representation to a representation that is understandable by said remote management server, said translation means residing in between said proxy bundle and said remote management server.

6. A management system according to claim 5, wherein said translation means comprise an eXtensible Markup Language or XML scheme based on eXtensible Stylesheet Language Transformations or XSLT syntax and semantics, or a dedicated application.

7. A management system according to claim 1, wherein said proxy bundle further comprises means configured to implement a service object interface not present on said management platform.

8. A management system according to claim 1, wherein said proxy bundle further comprises means adapted to troubleshoot running service objects on said management platform.

\* \* \* \* \*